United States Patent [19]

Burney et al.

[11] 4,313,805

[45] Feb. 2, 1982

[54] CHLORINE CELL CATHOLYTE SERIES FLOW

[75] Inventors: Harry S. Burney, Clute; Bobby R. Ezzell, Lake Jackson, both of Tex.

[73] Assignee: The Dow Chemical Company, Midland, Mich.

[21] Appl. No.: 126,278

[22] Filed: Mar. 3, 1980

[51] Int. Cl.³ .......................... C25B 1/16; C25B 9/00; C25B 13/08

[52] U.S. Cl. ..................................... 204/98; 204/257; 204/296

[58] Field of Search ................... 204/98, 128, 255–258, 204/263–266, 296

[56] References Cited

U.S. PATENT DOCUMENTS

| | | | |
|---|---|---|---|
| 4,057,474 | 11/1977 | Kurtz et al. | 204/257 X |
| 4,170,539 | 10/1979 | Simmons | 204/296 X |
| 4,178,218 | 12/1979 | Seko | 204/266 X |
| 4,188,469 | 2/1980 | Fang | 204/296 X |
| 4,189,369 | 2/1980 | Fang | 204/296 |
| 4,197,179 | 4/1980 | Ezzell et al. | 204/98 X |
| 4,209,367 | 6/1980 | Seko et al. | 204/98 |
| 4,212,713 | 7/1980 | Suhara et al. | 204/296 X |
| 4,217,198 | 8/1980 | Kadija | 204/296 X |

*Primary Examiner*—Delbert E. Gantz
*Assistant Examiner*—Donald R. Valentine
*Attorney, Agent, or Firm*—W. J. Lee

[57] ABSTRACT

Improvements in electrolytic chlor-alkali membrane cells, operated with cell-to-cell catholyte series flow, are obtained by the use, as membranes, of fluoropolymers containing pendant functional groups on the cathode side which are less hydrophilic than sulfonic acid groups. Preferably the functional groups on the catholyte side of the membrane absorb about 5 to about 12 moles of $H_2O$ per functional group whereas the functional groups on the anolyte side of the membrane absorb more, generally, about 15 to about 30 moles of $H_2O$ per functional group.

11 Claims, 6 Drawing Figures

CHLORINE CELL CATHOLYTE SERIES FLOW

BACKGROUND OF THE INVENTION

In general, the present invention pertains to electrolytic chlor-alkali membrane cells wherein fluoropolymer membranes are disposed between anodes and cathodes, thereby separating catholyte portions from corresponding anolyte portions. Such membranes are capable of transporting electrolysis ions while being substantially hydraulically-impermeable as opposed to the historically popular diaphragms (usually asbestos) which permit limited, but substantial, flow-through of the aqueous electrolyte solution.

More particularly, the present invention pertains to such membrane cells wherein the catholyte liquor flows sequentially from cell-to-cell (also called "series flow") as the anolyte liquor (brine) flows simultaneously through each of the anolyte portions (also called "parallel flow"). Also more particularly, the present invention pertains to the use of fluoropolymer membranes which have pendant functional groups on the cathode side which are less hydrophilic than the currently popular fluoropolymers having pendant fluorosulfonic acid groups.

It is known in the art that, when using membranes, a substantially salt-free caustic solution may be removed as the catholyte from the chlor-alkali cell. It is also known that water, or a weak caustic solution, may be initially fed to the first catholyte portion of the bank of membrane cells, then fed serially (sequentially) to one or more additional catholyte portions, gaining in caustic strength from cell-to-cell. This series flow (sometimes called "cascade flow") is taught, e.g., in U.S. Pat. Nos. 1,284,618; 4,057,474; and 4,076,603. These patents teach series catholyte flow as a means to increase caustic current efficiency when membranes are used that suffer a decrease in current efficiency as caustic strength is increased.

It has been reported that a "perfluorocarboxylic acid type membrane" gives excellent performance in comparison to a perfluoro sulfonic acid membrane sold under the trademark "Nafion" by E. I. duPont de Nemours and Company. This was reported by Maomi Seko or Asahi Chemical Industry Co., Ltd. in a paper titled *Commercial Operation of The Ion Exchange Membrane Chlor-Alkali Process* presented to The American Chemical Society Centennial Meeting at New York on April 4–9, 1976. The same author presented a subsequent paper titled *The Asahi Chemical Membrane Chlor-Alkali Process* to The Chlorine Institute, Inc., 20th Chlorine Plant Managers' Seminar at New Orleans, La. on Feb. 9, 1977, in which he defined "perfluorocarboxylic acid membrane" as having the chemical structure

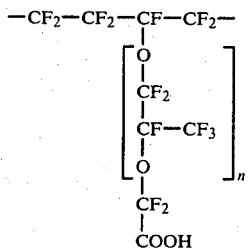

which is said to be less hydrophilic than perfluorosulfonic acid membranes.

Among the various Nafion ® types of fluoropolymer membranes which are said to be "perfluorosulfonic acid membranes" are those which have been modified by reaction with an organic amine (e.g. butyl amine) to convert at least part of the fluorosulfonic acid groups to sulfonamide groups. These sulfonamide groups are, like the perfluorocarboxylic acid groups described above, less hydrophilic than the perfluorosulfonic acid groups and therefore have greater resistance to back-migration of $OH^-$ ions from catholyte to anolyte. It is also known that fluoropolymer films containing functional sulfonyl fluoride groups can be post-treated with difunctional amines, such as ethylene diamine, to reduce the hydrophilicity of the functional groups by forming the sulfonamide group and by crosslinking the polymer. A pretreatment of such fluoropolymer, before forming it into the desired film, substantially reduces the solubility of the fluoropolymer and increases the softening temperature usually making the film-formation very difficult, if not impossible.

The fluoropolymer membranes of interest in the present invention are those which have greater hydrophilicity than polytetrafluoroethylene (Teflon ®) polymers alone, but which, on at least the cathode side, have less hydrophilicity than perfluorosulfonic acid membranes wherein the hydrophilic substituent of the fluoropolymer contains sulfonic acid groups, $[HO-SO_2-]$.

There are several interrelationships between various properties of a fluoropolymer membrane to be taken into consideration, such as:

1. The thicker the membrane (of a given composition) the greater is the electrical resistance through the membrane;

2. For a given thickness of the membrane the greater the population of functional groups, the greater is the electrical conductivity through the film; a functional group of, say, 1000 eq. wt. has more groups per mol. wt. unit than does one with, say, 1500 eq. wt.

3. For a given thickness of membrane, one with 1000 eq. wt. of functional groups is more hydrophilic than one with, say 1500 eq. wt. of the same functional group;

4. Strongly hydrophilic groups, such as sulfonic acid groups, reach a high degree of hydration in an operating cell, thus allowing penetration of the product hydroxide ion into the absorbed water surrounding the ion exchange site and this, in turn, leads to loss in caustic efficiency. At catholyte caustic strengths of about 18% or more, the performance of the membrane decreases with time; at less than about 18% caustic concentration, the performance of the membrane (current efficiency) is substantially stable with time. Decreasing the population of functional groups in the membrane causes a decrease in the water absorbed per functional group which in turn leads to higher caustic efficiency. Both the decrease in the number of functional groups and less hydration per functional group lead to an increase in electrical resistance (giving an increase in cell voltage);

5. Crosslinking of polymers containing sulfonic acid functional groups decreases the amount of water absorbed per functional group without suffering the attendant increase in voltage which would accompany a decrease in the number of functional groups. There is, however, a voltage increase associated with decreasing the water absorbed per functional group;

6. Employing carboxylic acid groups or sulfonamide groups in place of an equivalent number of sulfonic acid groups, provides less hydrophilicity per functional group. The number of functional groups can be increased so as not to suffer an appreciable increase in electrical resistance while still maintaining the water absorbed per functional group at a low enough level to achieve high caustic efficiency;

7. Theoretically, a membrane containing functional ion exchange groups should be operable with a monomolecular thickness, however such thin films would not have the strength and physical integrity required in practical applications. Therefore, it is necessary to employ, as membranes, sheets that have a thickness, generally, of at least about 2 mils and as much as 20 mils, the thickness being that of a sole sheet, a reinforced sheet, or a plurality of laminated sheets. For instance, a reinforced laminated sheet can be prepared from two films, each of about, say, 0.5 to 10 mils thickness, sandwiched together with a porous, reinforcing scrim in between them. Generally such sandwiched films are heat-plastified to effect bonding and the bonding process causes the two outside films to bond together at points of contact in the void spaces of the porous scrim. The overall thickness of the laminate is decided primarily by the thicknesses of the components, and somewhat by the pressure applied during bonding.

SUMMARY OF THE INVENTION

We have found, surprizingly and unexpectedly, that operation of a bank of electrolytic chlor-alkali membrane cells, using a cell-to-cell series flow of catholyte, is improved by employing a membrane which contains functional ion exchange groups on the catholyte side which absorb from about 5 up to about 12 moles of $H_2O$ per functional group. Preferably the membrane is a multilayer laminate of two or more layers in which the layer which comprises the catholyte side is from about 0.5 mils (0.013 mm) to about 2 mils (0.05 mm) mils in thickness. By employing such membrane, it is possible in a series catholyte flow process to achieve caustic concentrations of considerably greater than 18% without suffering appreciable loss of caustic efficiency and without suffering voltage penalties generally associated with operating at these higher caustic strengths.

DETAILED DESCRIPTION OF THE INVENTION

None of the Figures are drawn to scale. Each Figure is discussed more fully below.

Figure 1:
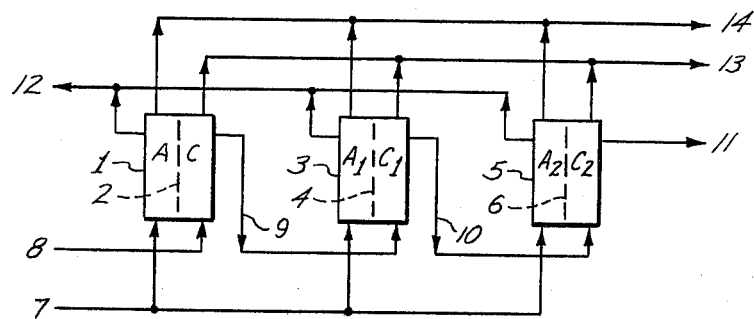
FIG. 1 is a visual aid for describing a bank of cells operated with cell-to-cell catholyte series flow.

FIG. 1 depicts a bank of three cells (1), (3), and (5) which contain, respectively, membranes (2), (4) and (6), each cell containing anolyte, denoted as (A), ($A_1$) and ($A_2$) and catholyte compartments, denoted as (C), ($C_1$) and ($C_2$). Each anolyte compartment contains at least one anode (not shown) and may contain many anodes. Each catholyte compartment contains at least one cathode (not shown) and may contain many cathodes. The anodes and cathodes of a given cell may be interleaved, in which case the membrane is designed to conform to the geometry of the interleaved electrodes so as to completely separate the catholyte and the anolyte compartments. Anolyte feed flows in parallel through flow means (7) to each of the anolyte compartments (A),($A_1$) and ($A_2$) and anolyte effluent from the anolyte compartments is gathered in a flow means (12). Catholyte feed flows (8, 9, 10, and 11) in series to catholyte compartment (C), then from (C) to ($C_1$), then from ($C_1$) to ($C_2$), accruing in caustic strength from cell-to-cell. Chlorine evolved from the anolyte compartments is collected in flow means (14) and gas from the catholyte compartments is collected in flow means (13). When a hydrogen-producing cathode is used, the gas collected in flow means (13) will be mostly hydrogen, but when an oxygen-depolarized cathode (also called "air cathode") is used, the gas from the catholyte will be mostly oxygen or air. When air cathodes are used there must be provided means for flowing oxygen or air to the cathode to "activate" the cathode. Though theoretically any plurality of cells may be used, limitations on flow means sizes will probably limit the number of cells in the bank to about 10. Preferably 3 to 8 cells are used, most preferably 4 to 6, with 5 being especially effective.

Figure 2:
FIG. 2 is a visual aid for description of a bilayer membrane.

FIG. 2 is a depiction of a bilayer membrane material having an anolyte side (a), and a catholyte side (c) laminated at (b). In the interface (b) the two outside layers (a) and (c) may be adhered directly together or may have an intermediate layer in between.

Figure 3:
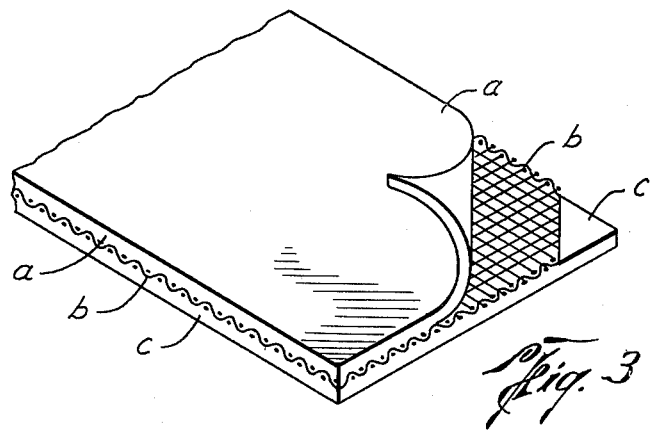
FIG. 3 is a visual aid for description of a bilayer membrane containing a reinforcing scrim between the layers.

FIG. 3 is a depiction of a membrane material having an anolyte side (a), an intermediate layer (b) which is depicted as a woven scrim, and a catholyte side (c). Cut-away portions reveal the scrim (b), the bounded face of (c), and (a) is peeled-back.

Figure 4:
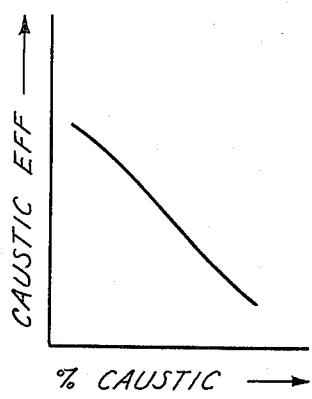
FIGS. 4, 5 and 6 are visual aids for explanation of caustic efficiency vs. caustic concentration for various cell operations.

FIG. 4 is a general depiction of results obtained in a process using a membrane wherein caustic efficiency decreases as the catholyte accrues caustic strength below about 18%; this is typical of sulfonic acid membranes.

Figure 5:
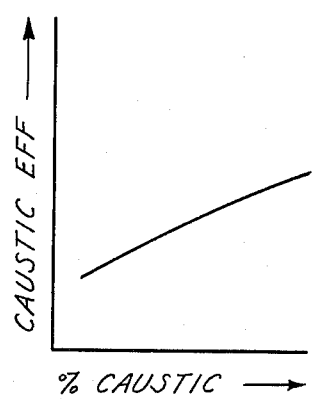

FIG. 5 is a general depiction of results obtained in a process using a membrane wherein caustic efficiency increases as the catholyte accrues caustic strength above about 18%; this is typical of membranes containing carboxylic acid functional groups.

Figure 6:
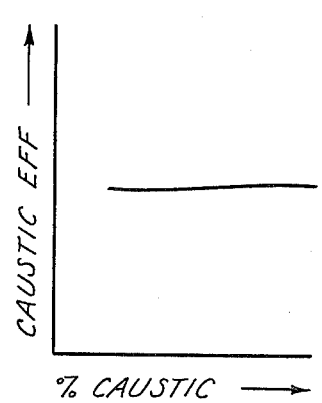

FIG. 6 is a general depiction of results obtained in a process using a membrane wherein caustic efficiency remains substantially constant as the catholyte accrues caustic strength; sulfonamide functional membranes generally exhibit this behavior.

While it is possible to prepare monofilms of fluoropolymers and then chemically treat only one surface to simulate the bilayer film of FIG. 2, it is difficult to adjust such surface-treatment process to obtain consistent treatment-depth from batch to batch and difficult to avoid unwelcome variances in the performance of the membrane. However, when reactive agents, such as ethylene diamine, are used to alter the characteristics of the functional groups on the fluoropolymer, such as creating sulfonamide functional groups, with or without crosslinking, the polymers are sometimes very difficult, if not impossible, to fabricate into the desired film structure; so it is sometimes necessary to fabricate the film and then perform the chemical modifications by treatment of the surface.

OPERABLE MEMBRANES

The dimensions and configuration of the thin fluoropolymer membrane sheets will depend somewhat on the cells in which they are to be used. The total thickness of the sheets may be in the range, generally, of about 2 mils (0.05 mm) to about 20 mils (0.5 mm) ususally in the range of about 4 mils (0.1 mm) to about 16 mils (0.4 mm). Sheets that are too thin are more likely to have unwanted "pin-holes" and also are more likely to become torn, stretched, or deformed during handling and use. Sheets that are too thick are likely to offer more resistance to electric current than is desired for efficient operation.

Fluoropolymers within the purview of this invention are those which are copolymers of vinyl fluoride, vinylidene fluoride, tetrafluoroethylene, trifluoroethylene, chlorotrifluoroethylene, dichlorodifluoroethylene, and the like with monomers containing groups that are, or can be, converted to ion exchange functional groups, said copolymers having pendant carboxylic acid groups, sulfonamide groups, or sulfonic acid groups including those which are in combination with the other groups or modified groups.

One of the membrane materials operable in the present invention is a commercially offered fluoropolymer from duPont under the trademark Nafion ® 030. It comprises a porous mesh of woven polytetrafluoroethylene (as a strengthening inner substrate) within a 7-mil thick film of a copolymer of a fluoroolefin and fluorosulfonated fluorocarbon vinyl ether (having about 1200 eq. wt.) wherein one surface has been treated to a depth of about 1 to about 1.5 mil with butylamine to convert the fluorosulfonyl groups to sulfonamide groups, the remainder of the fluorosulfonyl groups being converted to sodium sulfonate groups by hydrolysis. The surface containing the sulfonamide groups is the surface facing the cathode when the membrane is installed in a cell.

Basically, membranes useful in the present invention may be composed of single layers of membrane sheet, bilayers of two sheets bonded together or each layer adhered to opposite sides of a thin adherent film (such as in FIG. 2), or bilayers of sandwich-bonded sheets with a reinforcing or strengthening means between them (such as in FIG. 3).

In any case the cathode side of the membrane is one which is more hydrophilic than polytetrafluoroethylene, but has functional groups which are less hydrophilic than sulfonic acid groups, whether the sulfonic acid groups are of the [H]+ type or of the [Na]+ type. A convenient manner of expressing the hydrophilic nature of the operable functional groups is by expressing it as being those which absorb from about 5 to about 12 moles of $H_2O$ per functional group.

Preferably, the anode side of the membrane has functional groups which absorb more $H_2O$ per group than those on the catholyte side, preferably from about 15 to about 30 moles of $H_2O$ per group.

The eq. wt. of the functional groups may be in the range of about 500 to about 2000, preferably from about 700 to about 1200. Within these ranges, the eq. wt. of functional groups on the catholyte side of the membrane may be the same, may be more or may be less than on the anode side, depending on whether the same or different functional groups are on the two sides of the membrane. In optimizing the membrane performance, one should balance the positive effect on conductivity found in lower eq. wts. (having more hydrophilic functional groups) against the negative effect of excessive $H_2O$ absorption which accompanies lower eq. wts. (having functional groups which are more hydrophilic.)

EXAMPLE 1

A series of 5 cells are operated substantially in accordance with the catholyte-cascade method such as depicted in FIG. 1.

The cells are 27.6 sq. in. electrolytic chlor-alkali cell containing anodes and cathodes with membrane separators between corresponding anodes and cathodes, with electrical circuitry provided for flowing of electric current through electrolytes between corresponding anodes and cathodes. The cathodes are woven wire steel cathodes and the anodes are dimensionally-stable titanium substrates coated with a $RuO_2/TiO_2$ DSA ® type coating.

The membranes are Nafion ® 030 membranes (DuPont tradename) which are about 7 mils thick; they are prepared by reacting butylamine to a depth of about 1 to 1.5 mil on the cathode side and hydrolyzing the remaining 5.5 to 6 mil depth on the anode side of a 1200 eq. wt. copolymer of tetrafluoroethylene and a fluorosulfonyl-perfluorovinyl ether. The so-formed sulfonamide functional groups on the amine-treated side of the film are found to absorb about 8 to 12 moles of $H_2O$ per group.

The cell is equipped with a means for controlling temperature, means for flowing anolyte into and out of each cell in parallel, means for flowing catholyte from cell-to-cell in series (i.e., sequentially), means for removing cell gases from the electrolyte portions, and means for collection of effluents.

During operation the cells are operated at 27.6 amps (i.e., 1 amp./$in.^2$) at 80° C. Brine (25% NaCl) is fed to each anolyte portion at such a rate that 22% NaCl brine is removed from each anolyte portion. Water is fed to the first catholyte portion at a rate such that 28.4% caustic is removed from the fifth cell.

The caustic concentration, current efficiency and voltage of each cell is shown in the following Table I.

TABLE I

| Cell No. | Wt. % NaOH | Current Eff. (%) | Cell Voltage |
| --- | --- | --- | --- |
| 1 | 12.0 | 91.2 | 3.10 |
| 2 | 18.8 | 90.2 | 3.12 |
| 3 | 23.0 | 89.9 | 3.20 |
| 4 | 26.1 | 89.7 | 3.33 |
| 5 | 28.4 | 89.6 | 3.52 |
| Ave. |  | 90.1 | 3.25 |

The above results indicate that a 28.4% NaOH solution may be prepared with only a minor increase (0.5%) in current efficiency (i.e., 90.1−89.6=0.5) in the 5-cell catholyte-cascade, but with a substantial saving in power of 0.27 volts (i.e., 3.52−3.25=0.27) which is a 7.7% savings.

Even if one operates only the first three cells to obtain a 23% NaOH product, the 3-cell average for cell efficiency is 90.43% and the 3-cell average for voltage is 3.14, which by computation is seen to give a 0.5% gain in current efficiency and a voltage savings of 0.06 volts (1.9%). It can be seen from the data that the major gains to be made from the present invention are in power savings (as opposed to current efficiency) and at caustic strengths exceeding 18% NaOH.

It is usually normal practice to concentrate effluent cell caustic to about 50% concentration by evaporation before sending it elsewhere so as not to have to ship and store large quantities of water. This requires evaporation of about 4 times more water to e.g., concentrate a 12% solution to a given volume of 50% solution than it does with a 28% solution to obtain the same volume of 50% solution. Evaporation requires heat (energy) which is becoming increasingly expensive. Thus the benfits of operating the process according to the present invention are found not only in the process itself, but in subsequent evaporating process which receives the caustic effluent. If the membrane in the above example is used in a single-cell flow operation (non-series catholyte flow), production of 18.8% NaOH appears to be more attractive, energy-wise, than production of 28.4% NaOH, considering that the voltage penalty for making 28.4% caustic rather than 18.8% caustic is about 0.4 volts. The evaporative savings amounts to only about 0.8 tons of steam per ton of NaOH which, at 10,000 BTU/kwh, is only equivalent to about 0.3 volts. Thus, the evaporative energy saved is not less than the energy consumed by the increased cell voltage. On the other hand, operation using the series flow at 28.4% NaOH consumes only 0.13 volts (i.e., 3.25−3.12=0.13) more than single-cell operation at 18.8% NaOH and the evaporative energy saved (about 0.3 volts) is more than the increased power, thus it is economical to operate at 28.4% NaOH.

We claim:

1. A method for improving the electrical potential of a plurality of electrolytic chlor-alkali cells wherein the cells contain catholyte portions separated from anolyte portions by the use of fluoropolymer membranes, and wherein catholyte liquor flows from catholyte portion to catholyte portion in series, gaining an caustic strength as it flows from cell-to-cell, the strength of the caustic leaving the last cell of the series being greater than about 18%, the improvement comprising, employing as fluoropolymer membranes thin sheets of fluoropolymers containing functional pendant groups substituted in a manner so as to render the fluoropolymer more hydrophilic than polytetrafluoroethylene and less hydrophilic than fluoropolymers containing sulfonic acid groups attached to pendant perfluorocarbon groups.

2. The method according to claim 1 wherein the fluoropolymer membrane employed in the cells is selected from fluoropolymer membranes having carboxylic acid groups or sulfonamide groups attached to perfluorocarbon groups.

3. The method according to claim 1 wherein the fluoropolymer membrane has attached thereto sulfonamide groups.

4. The method according to claim 1 wherein the fluoropolymer membrane has attached thereto carboxylic acid groups.

5. The method according to claim 1 wherein the functional pendant groups, which are less hydrophilic than sulfonic acid substituted pendant groups, are present only on or within the menbrane surface which faces the cathode.

6. The method of claim 1 wherein the catholyte-side layer of the membrane has a thickness in the range of about 0.01 mm to about 0.05 mm.

7. The method of claim 1 wherein the membrane comprises a composite sheet of highly reticular reinforcement means sandwich-bonded between two adhered layers of perfluoropolymer sheets, wherein the layer facing the cathode contains functional pendant groups which are more hydrophilic than polytetrafluoroethylene and less hydrophilic than fluoropolymers having functional pendant sulfonic acid groups.

8. The method of claim 7 wherein the subject layer facing the cathode contains pendant carboxylic acid groups or sulfonamide groups.

9. The method of claim 8 wherein the subject layer facing the cathode contains pendant carboxylic acid groups.

10. The method of claim 8 wherein the subject layer facing the cathode contains pendant sulfonamide groups.

11. The method of claim 1 wherein the membrane is one in which the functional groups on the catholyte side of the membrane absorb about 5 to about 12 moles of $H_2O$ per functional group and the functional groups on the anolyte side absorb about 15 to about 30 moles of $H_2O$ per functional group.

* * * * *

UNITED STATES PATENT AND TRADEMARK OFFICE
CERTIFICATE OF CORRECTION

PATENT NO. : 4,313,805

DATED : February 2, 1982

INVENTOR(S) : Harry S. Burney and Bobby R. Ezzell

It is certified that error appears in the above—identified patent and that said Letters Patent is hereby corrected as shown below:

Col. 1, line 31; delete "the" before the word "blank" and insert --a--.

Col. 1, line 46; delete "or" and insert --of--.

Col. 4, line 32; delete "bounded" and insert --bonded--.

Col. 5, line 2; delete "ususally" and insert --usually--.

Col. 7, line 5; delete "benfits" and insert --benefits--.

Col. 7, Claim 1, line 33; delete "an" and insert --in--.

Col. 8, Claim 5, line 15; delete "menbrane" and insert --membrane--.

Signed and Sealed this

Sixth Day of July 1982

[SEAL]

Attest:

Attesting Officer

GERALD J. MOSSINGHOFF

Commissioner of Patents and Trademarks